United States Patent [19]

Misawa et al.

[11] Patent Number: 5,112,544
[45] Date of Patent: May 12, 1992

[54] METHOD OF MANUFACTURING ONE-END CLOSED CERAMIC DOUBLE TUBE

[75] Inventors: Hidenobu Misawa; Satoru Yamada, both of Nagoya, Japan

[73] Assignee: NGK Insulators, Ltd., Japan

[21] Appl. No.: 640,280

[22] Filed: Jan. 11, 1991

Related U.S. Application Data

[62] Division of Ser. No. 454,891, Dec. 22, 1989, abandoned.

[30] Foreign Application Priority Data

Dec. 22, 1988 [JP] Japan .................. 63-322156
Dec. 22, 1988 [JP] Japan .................. 63-322157
Dec. 22, 1988 [JP] Japan .................. 63-322158
Dec. 22, 1988 [JP] Japan .................. 63-322159

[51] Int. Cl.⁵ .................. B29C 47/00; B29C 47/12
[52] U.S. Cl. .................. 264/67; 264/150; 264/177.11; 264/177.14
[58] Field of Search ......... 264/67, 150, 172, 173, 264/177.11, 177.12, 177.14, 211.11

[56] References Cited

U.S. PATENT DOCUMENTS

| 3,562,879 | 2/1971 | Cremer et al. .................. 25/15 |
| 4,106,556 | 8/1978 | Heyn et al. .................. 165/81 |
| 4,142,580 | 3/1979 | Bailey .................. 165/142 |
| 4,168,944 | 9/1979 | Morikawa et al. .................. 425/464 |
| 4,751,152 | 6/1988 | Zymboly .................. 429/31 |
| 4,923,655 | 5/1990 | Oshima et al. .................. 264/60 |

FOREIGN PATENT DOCUMENTS

3136252A1 3/1983 Fed. Rep. of Germany .
63-312811 12/1988 Japan .

Primary Examiner—James Lowe
Assistant Examiner—Christopher A. Fiorilla
Attorney, Agent, or Firm—Parkhurst, Wendel & Rossi

[57] ABSTRACT

A method for manufacturing an one-end closed ceramic double tube, which includes the steps of extruding a ceramic double tube having inner and outer cylinders, drying the ceramic double tube, forming at least one passage in one end of the inner cylinder of the ceramic double tube so as to communicate an inner space of the inner cylinder with a gap formed between the inner cylinder and the outer cylinder, sealing the one end of outer cylinder proximate the one end of the inner cylinder, and firing the ceramic double tube.

6 Claims, 11 Drawing Sheets

FIG_2a

FIG_2b

FIG_2c

FIG_2d

FIG_2e

FIG_2f

FIG_6a

FIG_6b

FIG_7a

FIG_7b

FIG_11a

FIG_11b

FIG_11c

FIG_11d

FIG_11e

FIG_12

METHOD OF MANUFACTURING ONE-END CLOSED CERAMIC DOUBLE TUBE

This is a division of Ser. No. 454,891 filed Dec. 22, 1989, abandoned.

BACKGROUND OF THE INVENTION

1. Field of the Invention

The present invention relates to a one-end closed ceramic double tube comprising an inner cylinder and an outer cylinder connected with each other by a support portion to form an integral structure, and to a method of manufacturing the same.

2. Related Art Statement

One-end closed ceramic double tubes comprising an inner cylinder and an outer cylinder have heretofore been put to diversified uses, for example, various filters, heat exchangers, condensers, support tubes for solid oxide fuel cells, and the like.

Figure 12:
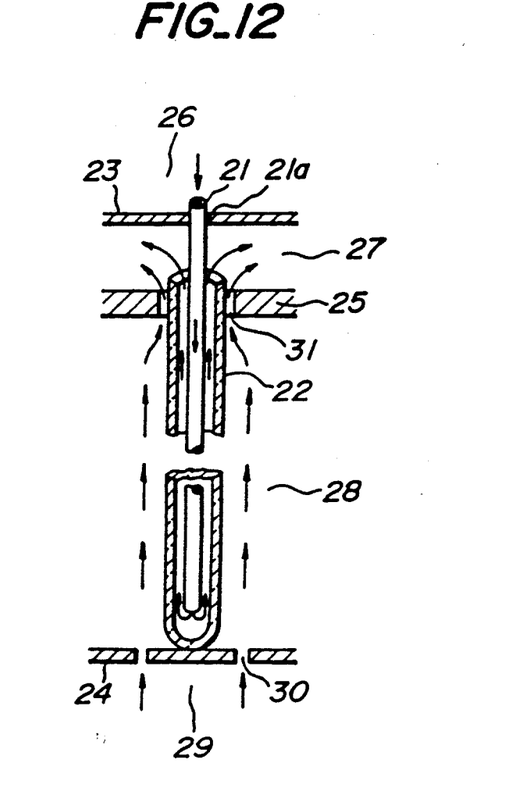
FIG. 12 shows an example of a conventional one-end closed ceramic double tube used as a support tube for solid oxide fuel cells.

FIG. 12 shows an example of conventional one-end closed ceramic double tubes having been used as a support tube for solid oxide fuel cells. In FIG. 12, for example, a solid oxide fuel cell comprises an air chamber 26, an exhaust gas chamber 27, a generating chamber 28 and a fuel chamber 29, arranged in series. An upper plate 23 defines the air chamber 26 and the exhaust gas chamber 27; a middle plate 25 defines the exhaust gas chamber 27 and the generating chamber 28; and a bottom plate 24 defines the generating chamber 28 and the fuel chamber 29. The middle plate 25 and the bottom plate 24 are provided with gas outlets 31 and fuel inlets 30, respectively. The support tube for solid oxide fuel cells has a one-end closed double tube structure which comprises a one-end closed, zirconia outer cylinder 22 and a separate inner cylinder 21 coaxially inserted therein. The outer cylinder 22 is provided on its outer peripheral surface with an electrode, a solid electrolyte layer, etc. not shown in this Figure. This outer cylinder 22 is supported at its closed bottom end by the bottom plate 24 and self-supported by being connected with a juxtaposed, adjacent double tubes' outer cylinders, not shown in this Figure, by the surface electrode or interconnects. Further, the inner cylinder 21 is supported on the upper plate 23 by engagement therewith of a flange 21a provided on the upper portion of the inner cylinder.

An oxidizing gas, such as air or the like, is supplied from the air chamber 26 into the inner cylinder 21. Turning back at the closed end of the outer cylinder 22, the oxidizing gas returns through a passageway between the outer periphery of the inner cylinder 21 and the inner periphery of the outer cylinder 22, and flows out into the exhaust gas chamber 27. On the other hand, a fuel gas, such as $H_2$, $CH_4$ or the like, fed through the fuel inlets 30 of the bottom plate 24, flows along the outer periphery of the outer cylinder 22, forming oxygen ions which migrate through the zirconia solid electrolyte. As a result, an electric current flows between an inner air electrode or cathode provided on the outer periphery of the outer cylinder 22 and an outer fuel electrode or anode provided on almost the entire periphery of the solid electrolyte, through an interconnect between the inner electrode of one outer cylinder and the outer electrode of an adjacent outer cylinder. Thus, the solid oxide fuel cell works as a battery. Since the fuel cells are used at a high temperature of about 1,000° C., one-end closed ceramic double tubes such as shown in FIG. 12, which can be jointlessly constructed, can be said to be preferable embodiments.

However, the one-end closed ceramic double tubes having the above-described construction have a problem in that it is difficult to achieve the positioning of the inner cylinder 21 within the outer cylinder 22, since the inner cylinder 21 and the outer cylinder 22 are separate bodies, and maintenance of the inner cylinder 21 is only attained by engagement of the flange 21a with the upper plate 23.

Further, as a result of the difficult positioning, the inner cylinder 21 assumes various positions within the outer cylinder 22, so that the flow rate of the oxidizing gas, such as air, varies accordingly, when the gas supplied through the inner cylinder 21 turns back at the closed end and goes up through the passageway between the outer periphery of the inner cylinder 21 and the inner periphery of the outer cylinder 22, causing problems such as uneven performances of each cell.

Moreover, since the inner cylinder 21 and the outer cylinder 22 are separate bodies, when the one-end closed ceramic double tubes having the above-described construction are used, for example, as a support tube for solid oxide fuel cells, it is difficult to obtain a sufficient mechanical strength to endure vibration or the like at the time of mounting and during operation.

Meanwhile, in order to solve the above problems, it may be conceivable to form the inner cylinder and outer cylinder into an integral body interposing a support portion therebetween. In this case, however, an extrusion molding into an integral body is required, which presents a problem such that a screw continuous extruder cannot make the outer and inner cylinders different in density. This is particularly a significant problem when the double tubes are used as a support tube for solid oxide fuel cells wherein the inner cylinder requires to be dense to gas-tight and the outer cylinder requires to be porous to gas permeation.

Further, in U.S. Pat. No. 4,751,152, there is proposed a porous, self-supporting, elongated electrode having a closed end, an inner wall defining a gas feed conduit, and at least one other gas exit conduit within the structure, where the conduits communicate with each other near the closed end of the structure. In this electrode, however, the support is comprised of an expensive electrode material in place of conventionally employed inexpensive materials, so that the cost of the whole electrode becomes so high that an economical disadvantage is unavoidable.

Furthermore, when the electrolyte and interconnect are provided on a part of the outer cylinder by means of, for example, chemical vapor phase deposition or the like, a selected portion on which the interconnect is provided has to be masked during deposition of the electrolyte to provide a discontinuity and then the electrolyte deposited portion has to be masked during deposition of an interconnect material on the discontinuity. This is very troublesome work.

SUMMARY OF THE INVENTION

An object of the present invention is to eliminate the above-mentioned problems and to provide a one-end closed ceramic double tube which enables a precise positioning of the inner cylinder within the outer cylinder and has a sufficient mechanical strength, as well as a method of manufacturing the same.

A further object of the present invention is to provide, at a low cost, a one-end closed ceramic double tube having high reliability and mechanical strength without deteriorating its performance as a support tube for solid oxide fuel cells, which is easy to fix interconnects thereon.

A first embodiment of the invention achieves the above objects is a one-end closed ceramic double tube comprising: a one-end closed outer cylinder; an inner cylinder having an outside diameter smaller than the inside diameter of said outer cylinder and extending concentrically with said outer cylinder from the vicinity of the closed end at least up to the open end of the outer cylinder; and at least one support portion extending centripetally from the inner periphery of the outer cylinder to connect with the outer periphery of the inner cylinder and longitudinally from one end of the inner cylinder on the closed end side of the outer cylinder at least up to the open end of said outer cylinder; said outer cylinder, inner cylinder and support portion being formed integrally into one body from a ceramic material, wherein the ratio of a total thickness of the support portions in contact with the inner circumference of the outer cylinder to the inner circumference of the outer cylinder at cross section is at most 25%.

In a preferable embodiment of the above double tube, the inner cylinder extends longitudinally beyond the open end of the outer cylinder.

In a further preferable embodiment, said one end of the inner cylinder on the closed end side of the outer cylinder is close to or in contact with the closed end of the outer cylinder and said one end of the inner cylinder is provided with at least one air passage communicating the inner space of the inner cylinder with the gap between the inner and outer cylinders.

Further, the inner cylinder is preferably formed denser than the outer cylinder.

A second embodiment of the invention is a one-end closed ceramic double tube comprising: a one-end closed outer cylinder; an inner cylinder having an outside diameter smaller than the inside diameter of said outer cylinder and extending concentrically with said outer cylinder from the vicinity of the closed end at least up to the open end of the outer cylinder; and at least one support portion extending centripetally from the inner periphery of the outer cylinder to connect with the outer periphery of the inner cylinder and longitudinally from one end of the inner cylinder on the closed end side of the outer cylinder at least up to the open end of said outer cylinder; said outer cylinder, inner cylinder and support portion being formed integrally into one body from a ceramic material, wherein the ratio of the outside diameter of the outer cylinder to the outside diameter of the inner cylinder is at most 3.3.

In the above double tube, it is preferred that the ratio of the total thickness of the support portions contacting the inner circumference of the outer cylinder at cross section is at most 25%.

Further, in a preferable embodiment of the above double tube, the inner cylinder extends beyond the open end of the outer cylinder. Furthermore, it is preferred that at least a part of the support portion exists outside the outer cylinder.

A method for manufacturing the one-end closed ceramic double tube according to the present invention comprises the steps of:

(1) extruding a ceramic material from a die having outer circularly arranged inner slits arranged concentrically therewith and at least one slit extending centripetally from said outer slit to said inner slit, thereby to mold a double tube consisting of an outer cylinder and an inner cylinder arranged concentrically and connected integrally therewith by at least one support portion, which outer and inner cylinder and support portion extend uniformly along the longitudinal axis of the double tube;

(2) drying the above extrusion-molded double tube;

(3) forming a passage communicating the inner space of the inner cylinder with the gap between the inner and outer cylinders at one end of the inner cylinder and sealing one end of the outer cylinder on the passage formed side of the inner cylinder;

(4) grinding the outer cylinder and at least a part of the support portion by a predetermined length along the longitudinal axis from the open end of the double tube to thereby protrude the inner cylinder from the outer cylinder; and (5) firing.

The above step (3) preferably comprises the substeps of:

(a) grinding the inner cylinder and the support portion by a predetermined axial length from one end of the double tube;

(b) inserting a cap made of a burnable organic material, having a rim diameter substantially equal to the inside diameter of the outer cylinder into said one end of the double tube, directing the convex top of the cap outwards; and (c) filling a space defined by the convex top surface of the cap and the outer cylinder at said one end with a slip which yields a ceramic having a thermal expansion coefficient at firing substantially equal to that of the double tube, followed by drying.

Alternatively, another preferable embodiment of the above step (3) comprises the sub-steps of:

(a') removing one end of the inner cylinder by a predetermined axial length from one end of the double tube; and (b') fixing a ceramic sealing member, preferably of the same material as the outer cylinder, on said one end of the double tube with a ceramic slip, preferably of said same material, followed by drying.

Furthermore, the method for manufacturing the one-end closed ceramic double tube according to the present invention preferably further comprises, after the above step (2), the step (2') of pouring a slip of fine particulate into the inner cylinder, followed by discharging said slip, thereby to form a fine particulate slip layer over the inner peripheral surface of the inner cylinder.

BRIEF DESCRIPTION OF THE DRAWINGS

The present invention will be explained in more detail hereinafter by way of example with reference to the appended drawings wherein.

DESCRIPTION OF THE PREFERRED EMBODIMENTS

Figure 1A:
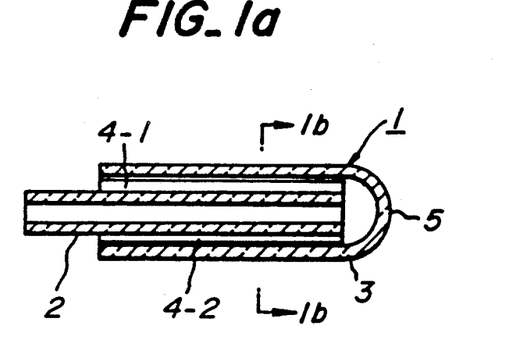
FIGS. 1a and 1b are a longitudinal sectional view showing one embodiment of the one-end closed ceramic double tube according to the invention, and a cross-sectional view taken along the line A—A thereof.
Figure 1B:
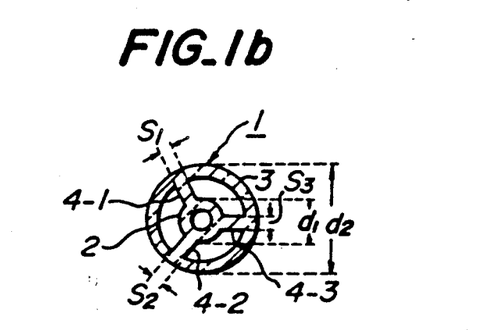

In the embodiment shown in FIGS. 1a and 1b, the one-end closed ceramic double tube 1 of the present invention is preferably constructed integrally by connecting an inner cylinder 2 and an outer cylinder 3 of the same ceramic material with each other by support portions 4-1~4-3. Further, the one-end closed ceramic double tube 1 is closed at its tip end 5 by sealing only the outer cylinder 3 like a test tube. A tip end of the inner cylinder 2 is open within the closed tip end 5. Alternatively, at the other open end of the one-end closed ceramic double tube 1, only the inner cylinder 2 is projected towards by a predetermined length from the outer cylinder 3.

What is important in the one-end closed ceramic double tube having the above-described construction according to the first invention is to compose the support portions 4-1~4-3 in such a fashion that, in the cross section shown in FIG. 1b, the sum of the thicknesses $S_1$, $S_2$ and $S_3$ of the support portions 4-1~4-3 at the portion in contact with the inner periphery of the outer cylinder 3 is at most 25% of the inner circumference of the outer cylinder 3. Further, what is important in the one-end closed ceramic double tube according to the second invention is to compose the inner cylinder 2 and outer cylinder 3 in such a fashion that, in the cross section shown in FIG. 1b, the ratio of the outside diameter $d_2$ of the outer cylinder 3 to the outside diameter $d_1$ of the inner cylinder 2 is at most 3.3.

In the above-described construction of the one-end closed ceramic double tube according to the present invention, since the inner cylinder and the outer cylinder are formed into an integral structure with support portions, specifying the shape of the support portions or the relation of the inner cylinder with the outer cylinder, a precise positioning of the inner cylinder within the outer cylinder can be performed, so that deterioration of reliability caused by variation of a relative position between the outer and inner cylinders becomes nil and prevention of lowering of a sufficient mechanical strength as well as a gas permeation rate that is important when used as a support tube for solid oxide fuel cells can be achieved. Further, by projecting the open end of the inner cylinder from the outer cylinder, the one-end closed ceramic double tube having an integral structure according to the invention can be used as a support tube for solid oxide fuel cells as it is, in the same manner as conventional ones.

The reason why the ratio of the total contact thickness of the support portions to the inner periphery of the outer cylinder is limited to at most 25% in the first embodiment is because when this ratio exceeds 25% the gas permeation rate decreases to 98% or less as demonstrated in Example 1 hereinafter, so that the performance as a support tube for solid oxide fuel cells is deteriorated.

Alternatively, the reason why the ratio of the outside diameter of the outer cylinder to the outside diameter of the inner cylinder is limited to at most 3.3 in the second embodiment is because when this ratio exceeds 3.3 the gas permeation rate also decreases to 98% or less, so that it turns out to be undesirable as a support tube for solid oxide fuel cells.

To manufacture the above-described one-end closed ceramic double tube having a structure as shown in FIGS. 1a and 1b according to the present invention, on the outset, a predetermined ceramic material, for example, a mixture of zirconia powder with a binder, is extruded from a predetermined die to mold a ceramic double tube consisting integrally of an inner cylinder 2, an outer cylinder 3 and support portions 4-1, 4-2 and 4-3 bridging the above inner cylinder 2 and outer cylinder 3, which inner and outer cylinders and support portions extend uniformly along the longitudinal axis of the ceramic double tube. Additionally, in extrusion molding according to the present invention, the shape of the support portions and/or the relation between the inner and outer cylinders should be made to satisfy predetermined conditions as illustrated above. Additionally, in this case, contraction during firing also should be taken into consideration. Then, one end of the outer cylinder of the obtained double tube is closed, for example, by fixing thereon a sealing member 5 preferably of the same material as the double tube, which has been separately manufactured and prepared in advance, with a predetermined slip or the like, or sealing up by means of a method as described hereinafter. Thereafter, the shaped double tube 1 is dried and then the outer cylinder 3 and at least a part of each of the support portions 4-1, 4-2 and 4-3, on the open end side of the dried double tube 1, namely, for example, the outer cylinder of a certain axial length from the open end and each of the support portion of an equivalent axial length or a part thereof, are removed by grinding. Finally, through firing the thus ground, dried double tube, the one-end closed ceramic double tube 1 of the invention is obtained. In this case, of course, a prefabricated sealing member 5 may be fixed on a sintered double tube after firing, with an inorganic sealing material, or a sintered body may be ground into a shape as illustrated above.

Next, steps of a preferred method for closing the end portion will be explained hereinafter, making reference to FIGS. 2a-2f.

Figure 2A:
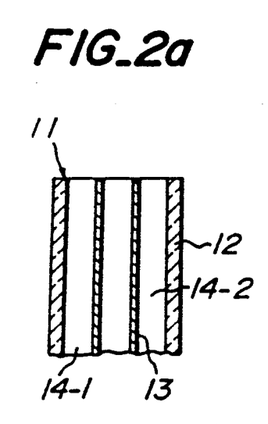
FIGS. 2a–2f are schematic diagrams showing an embodiment of the suitable method for sealing the end portion according to the invention in the order of steps.
Figure 2B:
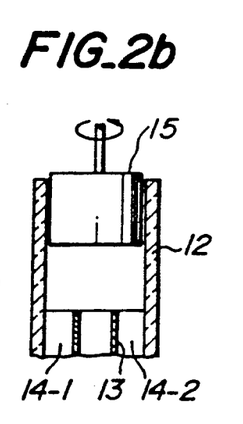
Figure 2C:
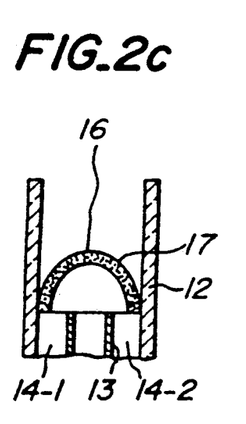
Figure 2D:
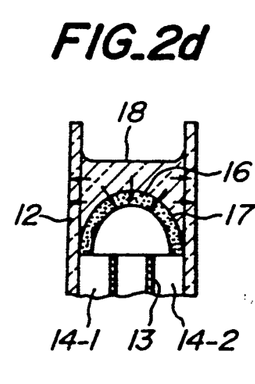
Figure 2E:
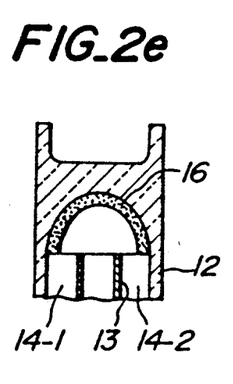
Figure 2F:
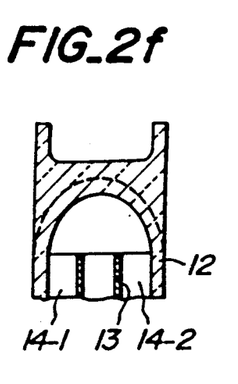

On the outset, a double tube 11 having an integral structure comprising an outer cylinder 12, an inner cylinder 13 and support portions 14-1 and 14-2, each having a predetermined shape and extending uniformly along the longitudinal axis of the double tube as shown in FIG. 2a, is shaped by extrusion molding from a die having orifices of a predetermined shape, i.e., comprising outer slits circularly arranged, inner slits arranged concentrically therewith and at least one slit extending centripetally from said outer slit to said inner slit, and then dried. Then, as shown in FIG. 2b, only the inner cylinder 13 and the support portions 14-1 and 14-2 are ground by a predetermined depth from one end of the double tube, with a diamond grindstone 15 having a diameter substantially equal to the inside diameter of the outer cylinder 12. Then, as shown in FIG. 2c, a cap 16 made of a burnable organic material, such as an organic porous body, having a rim diameter substantially equal to the inside diameter of the outer cylinder, is inserted into the outer cylinder 12 at the above one end of the double tube, directing the convex top 17 of the cap 16 outwards. The shape of the convex top 17 should correspond to a desired inner shape of the closed end to be formed. As the cap 16 of an organic porous material, a water-absorbent filter paper or the like also can be employed. Then, as shown in FIG. 2d, a slip 18 which yields a ceramic having a thermal expansion coefficient at firing substantially equal to that of the double tube 11 is poured into the space defined by the convex top surface 17 of the cap 16 and the outer cylinder 12, wherein the slip consolidates as its water is absorbed into the outer cylinder 12 and the organic porous cap 16 as shown by the arrows. Then, in the step shown in FIG. 2e, the double tube is dried and then fired at which time the organic porous cap 16 burns out. Thus, a one-end closed ceramic double tube as shown in FIG. 2f is obtained, which has a closed end portion with a predetermined concave inner shape. When it is put into practical use, the top of the closed end portion is cut away or ground into a predetermined outer shape as shown by the broken line in FIG. 2f.

Other embodiments of the one-end closed ceramic double tube according to the invention are shown in FIGS. 3a–3c, FIGS. 4a and 4b, and FIG. 5, respectively, wherein like reference characters designate like or corresponding parts throughout the several views.

Figure 3A:
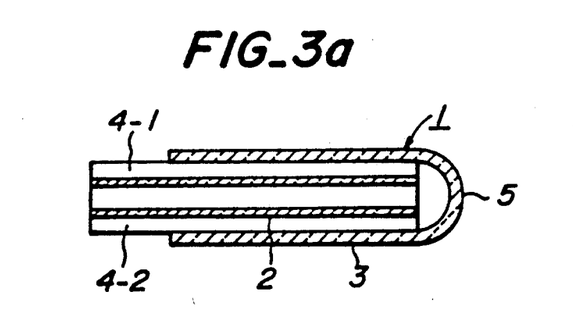
FIGS. 3a—3c, FIGS. 4a and 4b, and FIG. 5 are longitudinal sectional views or a fragmentary sectional view showing other embodiments of the one-end closed ceramic double tube according to the invention, respectively.
Figure 3B:
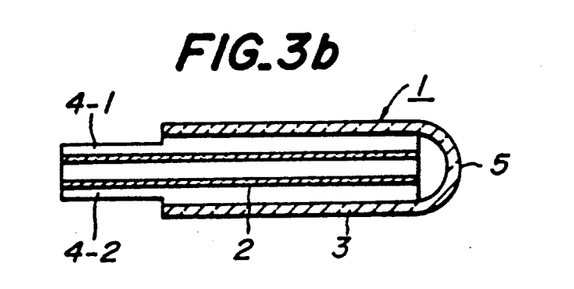
Figure 3C:
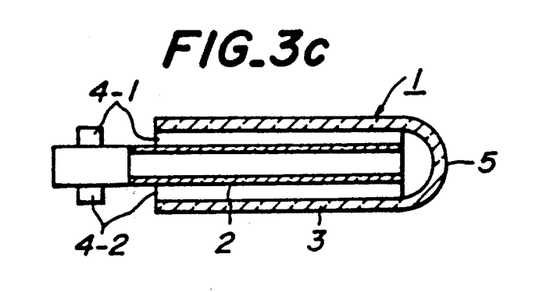

FIGS. 3a–3c are longitudinal sectional views showing embodiments of the one-end closed ceramic double tube, respectively, having an outer cylinder 3 and/or support portions 4-1~4-3 partly ground by a different manner from the example shown in FIG. 1. Namely, FIG. 3a shows an embodiment wherein only a part of the outer cylinder 3 has been removed by a certain axial length on the open end side. Alternatively, FIGS. 3b and 3c show embodiments wherein parts of the outer cylinder 3 and the support portions 4-1~4-3 have been removed on the open end side. In the embodiments shown in FIGS. 3a and 3b, the exposed parts of the support portions 4-1~4-3 serve as heat-exchanging fins, so that a heat exchanging efficiency is improved to increase an effect of preheating oxygen gas flowing into the inner cylinder 2.

Alternatively, by leaving some parts of the support portions 4-1~4-3 in the form of lateral projection, as shown in FIG. 3c, the fixation of the double tube on apparatuses can be facilitated by making use of these remained projections, as shown in an example which will be described hereinafter.

Further, it is preferred to provide a flange on the projecting portion of the inner cylinder, since supporting of the double tube is facilitated particularly in the case where the double tube is used as a support tube for solid oxide fuel cells.

Figure 4A:
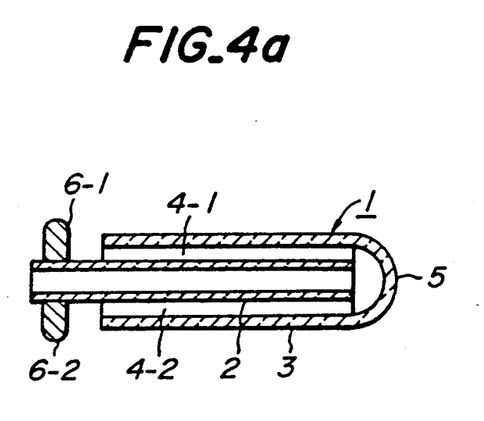
Figure 4B:
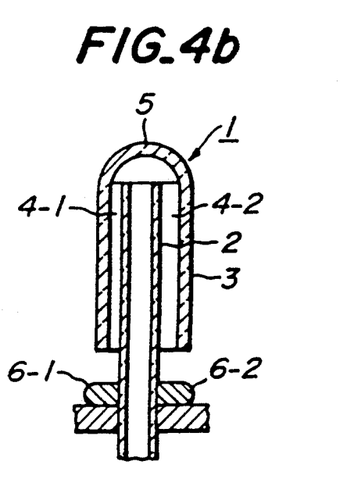

FIG. 4a shows an example wherein the outer cylinder and the support portions 4-1~4-3 are partly ground by a predetermined axial length on the open end side and flange portions 6 1 and 6-2 are fixed on the projecting portion of the inner cylinder 2. Namely, as shown in FIG. 4b, in the case where the double tube is used as a support tube for solid oxide fuel cells in the same manner as the conventional example shown in FIG. 12, the fixation upon an apparatus can be easily attained by engaging the flange portions 6-1 and 6-2 with the upper plate 23.

Figure 5:
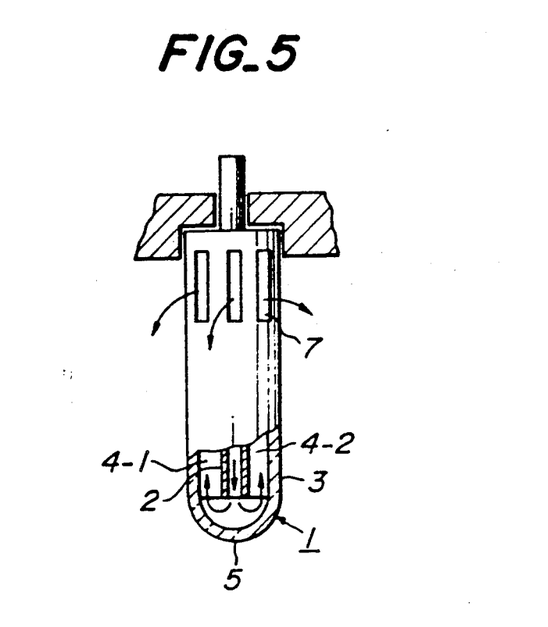

FIG. 5 shows an example wherein the outer cylinder 3 and the support portions 4-1~4-3 are partly ground off by a limited axial length on the open end side of the double tube to project only the inner cylinder 2 and further the upper portion of the outer cylinder 3 is partly ground to provide slits 7 thereon. Since this example has a structure that allows the oxidizing gas being supplied into the inner cylinder 2, turning back at the tip portion 5 and returning, to flow out through the slits 7 into the exhaust gas chamber, when the double tube of this example is used as a support tube for solid oxide fuel cells in the same manner as the conventional one shown in FIG. 12, the positioning and fixing can be achieved by insertion-fitting the projecting portion without support portions of the inner cylinder 2 into an aperture of the upper plate 23.

Figure 6A:
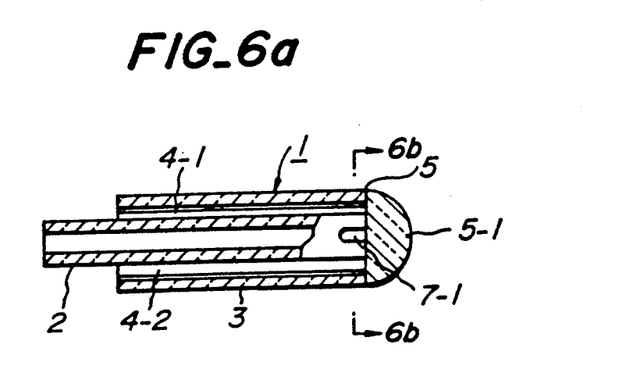
FIGS. 6a, 6b, FIGS. 7a, 7b, FIGS. 8a, 8b, FIGS. 9a, 9b and FIGS. 10a, 10b are longitudinal sectional views showing further different embodiments of the one-end closed ceramic double tube according to the invention, cross-sectional views taken along the line A—A thereof, respectively.
Figure 6B:
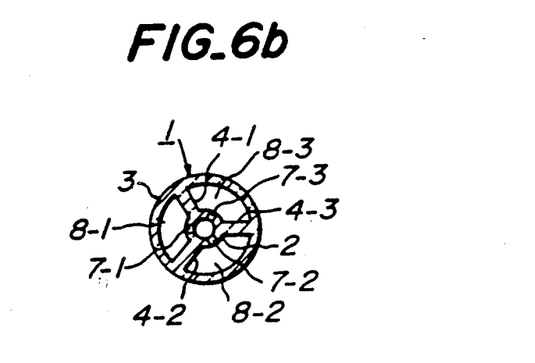

A further different modification of the one-end closed ceramic double tube according to the invention as well as a different preferred method for closing the end portion will be explained hereinafter, with reference to FIGS. 6a and 6b. In FIGS. 6a and 6b, at the closed one-end 5 of the ceramic double tube 1 according to the present invention, both the inner cylinder 2 and outer cylinder 3 are closed with a solid sealing member 5-1, while the inner cylinder 2 is provided in the vicinity of the sealing member 5-1 with air passages 7-1~7-3. These air passages 7-1~7-3 are provided at closed end portions of the inner cylinder 2, corresponding to passageways 8-1~8-3 defined by the outer cylinder 3, inner cylinder 2 and support portions 4-1~4-3. Besides, at the other end, the open end, of the one-end closed ceramic double tube 1, the inner cylinder 2 is projected by a predetermined length from the outer cylinder 3 and support portions 4-1~4-3. In this case, the support portions 4-1~4-3 also may be projected together with the inner cylinder 2.

To manufacture the above-described one-end closed ceramic double tube having a structure as shown in FIGS. 6a and 6b according to the present invention, on the outset, a predetermined ceramic material, for example, a mixture of zirconia powder with a binder, is extruded from a predetermined die as described hereinbefore to mold a ceramic double tube having an integral structure consisting of an inner cylinder 2, an outer cylinder 3 and support portions 4-1, 4-2 and 4-3 bridging the above inner cylinder 2 and outer cylinder 3, which cylinders and support portions extend uniformly along the longitudinal axis of the double tube. Then, one end of the inner cylinder is provided with air passages 7-1, 7-2 and 7-3 in the number corresponding to that of the passageways defined by the outer cylinder, inner cylinder and support portions. At the thus air passages-provided end of the double tube, a sealing member 5-1 which has been produced, for example, from preferably the same material and prepared separately in advance, is fixed onto the inner cylinder, outer cylinder and support portions with a predetermined sealing material, such as a slip or the like. Thereafter, the shaped double tube 1 is dried and then the outer cylinder 3 and at least a part of each of the support portions 4-1, 4-2 and 4-3, on the open end side of the dried double tube 1, namely, for example, the outer cylinder of a certain axial length from the open end and each of the support portion of an equivalent axial length or a part thereof, are removed by grinding. Finally, through firing the thus ground, dried double tube, the one-end closed ceramic double tube 1 having an integral structure of the invention is obtained. In this case, of course, a prefabricated sealing member may be fixed on a sintered double tube after firing.

Further different embodiments of the one-end closed ceramic double tube according to the present invention will be illustrated hereinafter, with reference to FIGS. 7a, 7b, 8a, 8b, 9a and 9b, respectively, wherein like reference characters designate like or corresponding parts throughout the several views.

Figure 7A:
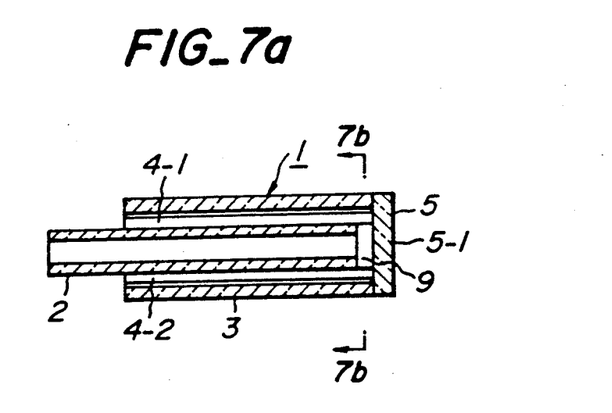
Figure 7B:
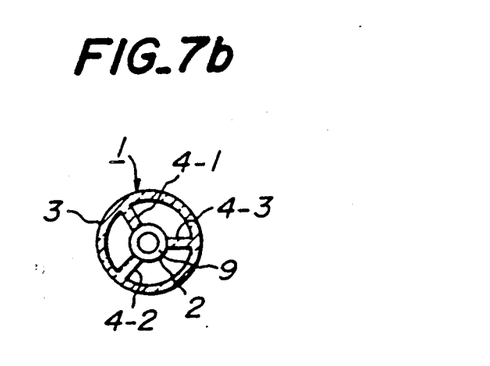

FIGS. 7a and 7b show an embodiment wherein only the inner cylinder 13 is ground by a predetermined depth from one end of the double tube to provide air passages 9 and this one end is closed with a flat disc-like sealing member 5-1 having a rectangular cross-section along its axis, which forms an end portion 5. In this embodiment, the air passages 9 can be formed more easily than the air passages 7-1~7-3 shown in FIGS. 6a and 6b, namely, with a single grinding operation by a diamond grindstone having substantially the same diameter as the outside diameter of the inner cylinder 2.

Figure 8A:
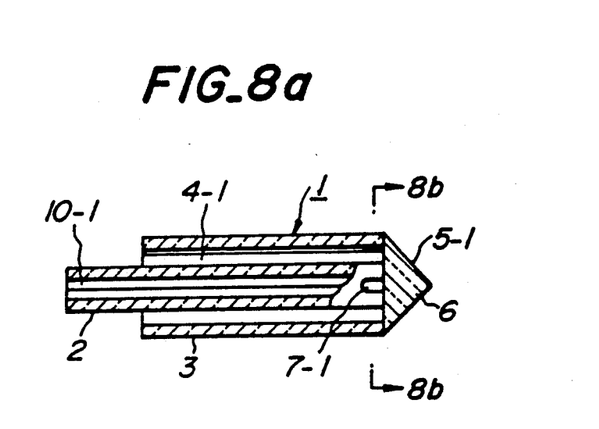
Figure 8B:
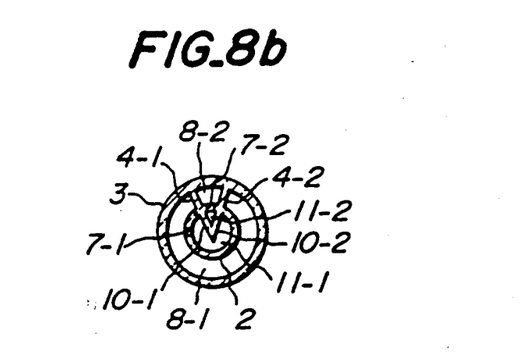

In FIGS. 8a and 8b, the support portions 4-1 and 4-2 are extended centripetally into the inner cylinder 2 to form partitions 10-1 and 10-2, respectively, defining inner air passageways 11-1 and 11-2 inside the inner cylinder 2, which correspond, respectively, to outer air passageways 8-1 and 8-2 defined by support portions 4-1 and 4-2 in the gap between the inner cylinder and the outer cylinder. While, air passages 7-1 and 7-2 are provided on the inner cylinder 2 which communicate the outer air passageways 8-1 and 8-2 with the corresponding inner passageways 11-1 and 11-2, respectively. With this embodiment, interconnects can be formed by means of a vapor phase reaction or the like on the surface of a porous air electrode formed on the outer peripheral surface of the outer cylinder 3 corresponding to the outer passageway 8-2, by supplying a reactive gas into the inner passageway 11-2 defined in the inner cylinder 2 which returns through the outer passageway 8-2. Similarly, if another fed reactive gas returns through the inner passageway 11-1 defined within the inner cylinder 2 to the outer passageway 8-1, a solid electrolyte can be formed by means of a vapor phase reaction or the like over the outer peripheral surface of the outer cylinder 3 corresponding to the outer passageway 8-1.

Figure 9A:
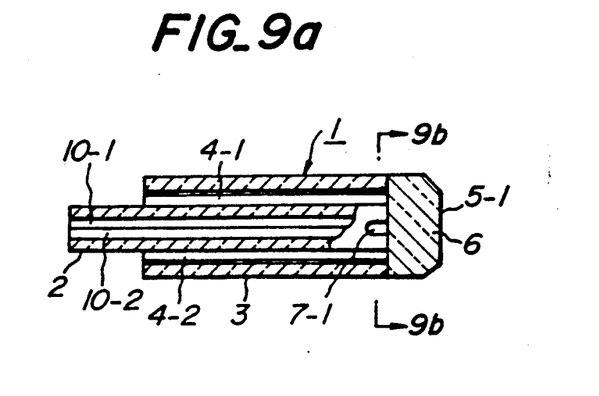
Figure 9B:
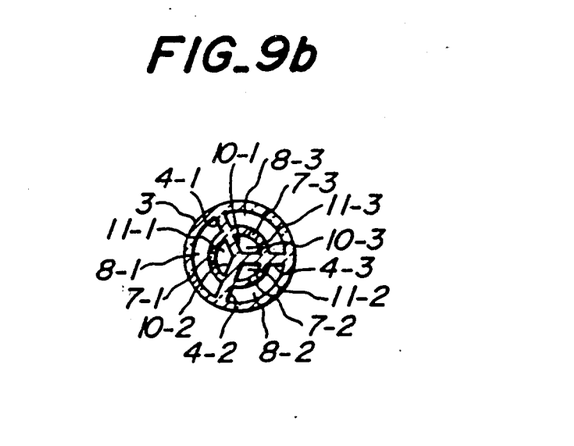

In FIGS. 9a and 9b, similarly to FIGS. 8a and 8b, the support portions 4-1~4-3 are extended centripetally into the inner cylinder 2 to form partitions 10-1~10-3, respectively, defining inner air passageways 11-1~11-3 inside the inner cylinder 2, while, air passages 7-1~7-3 are provided on the inner cylinder 2. In this embodiment, the surfaces of the support portions 4-1~4-3 and the partitions 10-1~10-3 are made to have a density higher than the other portions by applying thereto a slip capable to form a predetermined denser layer. With this embodiment, air-leakage through the support portions 4-1~4-3 and the partitions 10-1~10-3 can be prevented.

Further, in the above-described modifications, the air passages to be provided on the end of the inner cylinder may be formed annularly or in the form of slit or aperture. However, in the case where the passages are in the form of slit or aperture, they must be provided to communicate each and every outer passageway in the gap between the outer and inner cylinders with the corresponding inner passageway.

Furthermore, with the one-end closed ceramic double tube having the above-described construction, namely, having the support portions centripetally extending in the inner cylinder to form partitions defining inner passageways in the inner cylinder corresponding respectively to the outer passageways defined in the gap between the inner and outer cylinders by the support portions, and forming slits or apertures communicating between each and every corresponding inner and outer passageways, local formation of a membrane by means of a vapor phase reaction can be advantageously achieved on the outer peripheral surface of the outer cylinder. For example, like in the case of formation of interconnects of solid oxide fuel cells, namely, such an interconnect can be formed by means of a vapor phase reaction by flowing a reactive gas only through the air passageway corresponding to the portion for the interconnect to be formed, thereby eliminating a masking step that has been required in the conventional processes.

Figure 10A:
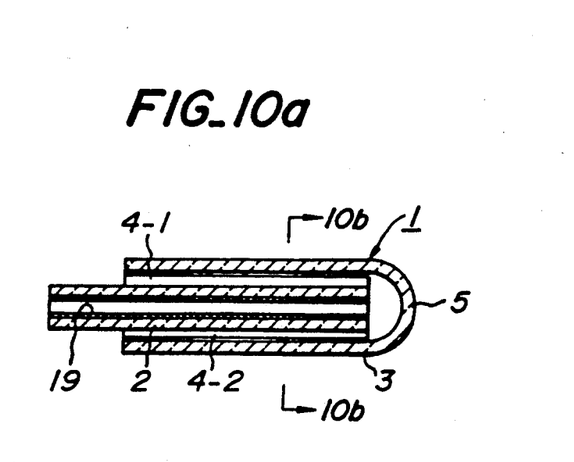
Figure 10B:
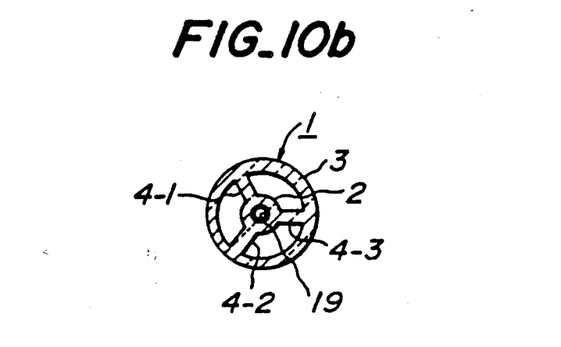

Furthermore, the one-end closed ceramic double tube according to the invention are preferred to have the inner cylinder denser than the outer cylinder. In FIGS. 10a and 10b, the entire inner surface of the inner cylinder 2 is provided with a dense layer 19 which is denser than the ceramic composing the outer cylinder 3 and support portions 4-1~4-3, preferably which has a void volume ratio of not exceeding 10%.

To manufacture such a one-end closed ceramic double tube, at the outset, a predetermined ceramic material, for example, a mixture of zirconia powder with a binder, is extruded from a predetermined die as described hereinbefore to mold a ceramic double tube having an integral structure consisting of an inner cylinder 2, an outer cylinder 3 and support portions 4-1, 4-2 and 4-3 bridging the above inner cylinder 2 and outer cylinder 3, which cylinders and support portions extend uniformly along the longitudinal axis of the double tube. Then, after drying the extrusion molded body, one end of the inner cylinder is plugged with a stopper and a slip of fine particulate is poured into the inner cylinder. Then, after the stopper has been removed to discharge the slip of fine particulate, a sealing member which has been produced, for example, from the same material and prepared separately in advance, is fixed onto the outer cylinder with a predetermined slip or the like, or the end of the outer cylinder is sealed in accordance with the aforementioned method. Additionally, the application of the slip onto the inner peripheral surface of the inner cylinder of the double tube, of course, may be performed by a method wherein the slip is poured into a slant double tube rotating around its longitudinal axis.

Further, as a method to mold an integral structure comprising an outer cylinder and a denser inner cylinder, a piston extruder of double structure can be employed. In this case, double tubes can be molded in an integral structure comprising the inner and outer cylinders either different in material or density, by selecting materials for the inner and outer cylinders appropriately in accordance with the intended object.

The thus molded and one-end closed double tube comprising the inner and outer cylinders different in density or material is dried and then the outer cylinder and at least a part of each of the support portions, on the open end side of the dried double tube, namely, for example, the outer cylinder of a certain axial length from the open end and each of the support portion of an equivalent axial length or a part thereof, are removed by grinding, as described hereinbefore. Finally, through firing the ground and dried double tube, the one-end closed ceramic double tube of the invention is obtained.

Additionally, the grinding of the outer cylinder and support portions may, of course, be conducted either on green or sintered bodies Thus, by making the inner cylinder denser than the outer cylinder, air leakage from inside of the inner cylinder can be prevented.

Though the support portions are arranged radially in the foregoing embodiments, it is apparent that the number and the shape of the support portions are not so limited. For example, the support portions may not necessarily extend radially, but when the outer cylinder and the inner cylinder are in contact with each other by a point, line or face, the contact portion can be accounted for as a support portion.

Figure 11A:
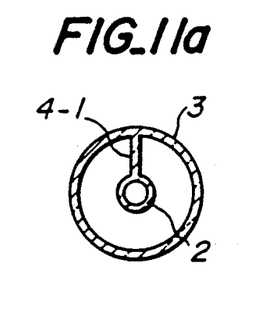
FIGS. 11a—11e are cross-sectional views showing other embodiments of the one-end closed ceramic double tube according to the invention, respectively.
Figure 11B:
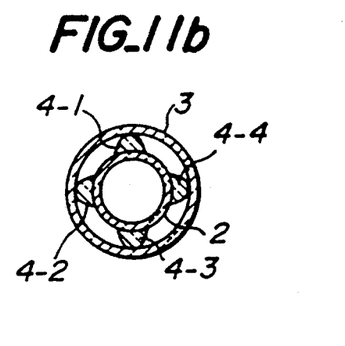
Figure 11C:
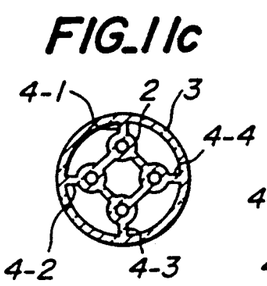
Figure 11D:
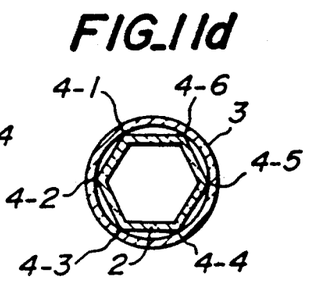
Figure 11E:
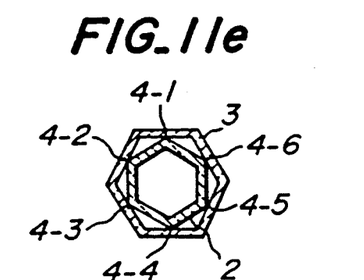

FIGS. 11a and 11b show examples having a different number and shape of the support portion, respectively, and FIG. 11c shows an example wherein a plurality of inner cylinders are arranged eccentrically within the outer cylinder. Alternatively, FIGS. 11d and 11e show examples wherein the outer and inner cylinders are in contact with each other on lines as support portions. FIG. 11d shows a hexagonal inner cylinder and FIG. 11e shows both the inner and outer cylinders being hexagonal. All of the examples shown in FIGS. 11a~11e should be understood to be in the scope of the present invention.

As understood from the above explanation, with the one-end closed ceramic double tube and the method of manufacturing the same, according to the invention, since a ceramic double tube is obtained by integrally forming an inner cylinder and an outer cylinder having a predetermined relation of the outside diameter between the inner and outer cylinders as being connected with each other by a support portion having a predetermined cross-sectional shape, subsequently sealing one end of the outer cylinder with ceramics, providing an air passage on the inner cylinder on the closed end side, preferably providing a dense layer on the inner periphery of the inner cylinder and projecting one open end of the inner cylinder from the outer cylinder by grinding the thus formed dried green or sintered body, it is possible to easily obtain a one-end closed ceramic double tube comprising an inner cylinder having a density higher than that of the outer cylinder and having high reliability and sufficient mechanical strength.

In order to employ the one-end closed ceramic double tube according to the present invention as a support tube for solid oxide fuel cells, the inner cylinder is preferred to have an open porosity of not exceeding 10%. Alternatively the outer cylinder is preferred to have an outside diameter of 10~40 mm, a wall thickness of 1~5 mm, a length of 500~1,000 mm and an open porosity of 30~40%. Further, as a ceramic material for the outer cylinder, preferably employed are those having a thermal expansion coefficient adaptable to electrode, solid electrolyte or the like formed on the surface of the outer cylinder and having a stability for high temperatures during reaction of the fuel, for example, a calcia- and/or yttria-stabilized zirconia, alumina or the like. Alternatively, in order to employ the one-end closed double tube according to the present invention as a heat exchanger, it is preferred to be formed from a high heat conductive ceramic, such as silicon carbide, silicon nitride, or the like. Further, in order to use as various filters, it is preferred to be formed from a corrosion resistant ceramic, such as alumina or the like. Thus, the one-end closed ceramic double tube according to the invention can be properly manufactured from a ceramic material suitably selected in accordance with its intended use, which can be suitably used as filters, heat exchangers, concentrators and further a support tubes for solid oxide fuel cells.

The present invention will be further explained in more detail hereinafter by way of example.

EXAMPLE 1

In accordance with the above described method, test pieces of double structure porous ceramic support tubes were manufactured which comprised an outer cylinder with an outside diameter of 13 mm and a wall thickness of 1 mm and an inner cylinder with an outside diameter of 8 mm and a wall thickness of 0.7 mm, which were made to vary in ratio (r) of a total thickness of the support portions in contact with the inner periphery of the outer cylinder to the inner periphery of the outer cylinder between 0% and 50% by changing the number of the support portions over 1~24. With the manufactured test pieces, a gas permeation rate from the outer cylinder was determined when air was supplied from the inner cylinder. The results are shown in Table 1. In Table 1, the gas permeation rate is represented by a ratio of the gas permeation rate of the test piece assuming that of a conventional double tube without support portions is 100.

TABLE 1

| Ratio of support portions (r) (%) | *0 | 1 | 3 | 5 | 11 | 18 | 22 | 25 | 36 | 45 | 50 |
|---|---|---|---|---|---|---|---|---|---|---|---|
| Gas permeation rate | 100 | 100 | 100 | 99.6 | 99.2 | 98.9 | 98.4 | 98.2 | 94.6 | 82.3 | 78.3 |

Note: *Conventional double tube without support portions.

It was found from the results shown in Table 1 that when the ratio of the total thickness (r) of the support portions in contact with the inner periphery of the outer cylinder exceeds 25%, the gas permeation rate decreases by 2% or more, which is not preferred to be applied to solid oxide fuel cells resulting in poor performances due to an appreciable lowering of the gas permeation rate.

EXAMPLE 2

In accordance with the above described method, double structure porous ceramic support tubes were manufactured which comprised an outer cylinder with an outside diameter of 13 mm and a wall thickness of 0.5 mm and support portions 0.5 mm thick, having a ratio of total thickness in contact with the inner periphery of the outer cylinder being 11%, which were made to vary in the ratio of the outside diameter of the outer cylinder to the outside diameter of the inner cylinder between 1.3 and 6.5. The gas permeation rate was determined on the thus manufactured support tubes in the same manner as Example 1. The results are shown in Table 2. In Table 2, the gas permeation rate is represented by a ratio of the gas permeation rate assuming that of a double tube having a ratio of the outside diameter of the outer cylinder to the outside diameter of the inner cylinder of 1.3 is 100.

TABLE 2

| Ratio of outside diameters | 1.3 | 1.4 | 1.6 | 2.0 | 2.2 | 2.6 | 3.3 | 4.3 | 6.5 |
|---|---|---|---|---|---|---|---|---|---|
| Gas permeation rate | 100 | 100 | 99.8 | 99.5 | 99.3 | 98.7 | 98.2 | 96.3 | 95.1 |

It was found from the results shown in Table 2 that when the ratio of the outside diameter of the outer cylinder to the inner cylinder exceeds 3.3, the gas permeation rate largely decreases, which is not preferred to be applied to solid oxide fuel cells resulting in poor performances.

What is claimed is:

1. A method for manufacturing an one-end closed ceramic double tube, comprising the steps of:

extruding a ceramic material from a die having at least one circular outer slit, at least one circular inner slit arranged concentrically with said at least one outer slit, and at least one slit extending centripetally from said outer slit to said inner slit, to thereby mold a ceramic double tube consisting of an outer cylinder and an inner cylinder arranged concentrically and connected integrally with said outer cylinder by at least one support portion, said outer cylinder, said inner cylinder and said support portion extending uniformly along a longitudinal axis of said ceramic double tube;

drying said ceramic double tube;

forming at least one passage at one end of said inner cylinder, said passage communicating an inner space of said inner cylinder with a gap formed between said inner cylinder and said outer cylinder;

sealing one end of said outer cylinder proximate said one end of said inner cylinder, such that said one end of said outer cylinder is sealed entirely and said at least one passage at said one end of said inner cylinder remains open; and firing said ceramic double tube.

2. The method of claim 1, further comprising, before said firing step, the step of grinding said outer cylinder and at least a part of said support portion by a predetermined length along said longitudinal axis from an open end of said double tube to thereby protrude said inner cylinder from said outer cylinder.

3. The method of claim 1, wherein said forming step comprises the steps of:
   (a) grinding said one end of said inner cylinder and said support portion by a predetermined axial length from one end of said ceramic double tube;
   (b) inserting a cap made of a combustible organic material and having a rim diameter substantially equal to an inside diameter of said outer cylinder into said one end of said ceramic double tube, directing a convex top surface of said cap outwards;
   (c) filling a space defined by said convex top surface of said cap and said outer cylinder at said one end of said ceramic double tube with a slip which yields a ceramic having a thermal expansion coefficient at firing which is substantially equal to that of said ceramic double tube; and
   (d) drying said slip.

4. The method of claim 1, wherein said forming step comprises the step of:
   (a) removing said one end of said inner cylinder by a predetermined axial length from one end of said ceramic double tube;
   (b) fixing a ceramic sealing member on said one end of said ceramic double tube with a ceramic slip; and
   (c) drying said slip.

5. The method of claim 4, wherein said ceramic sealing member and said ceramic slip comprise the same material as that of said outer cylinder.

6. The method of claim 1, further comprising, after said drying step, the step of pouring a slip of fine particulate material into said inner cylinder, followed by discharging said slip, thereby forming a fine particulate slip layer over an inner peripheral surface of said inner cylinder.

* * * * *